Figure 1:
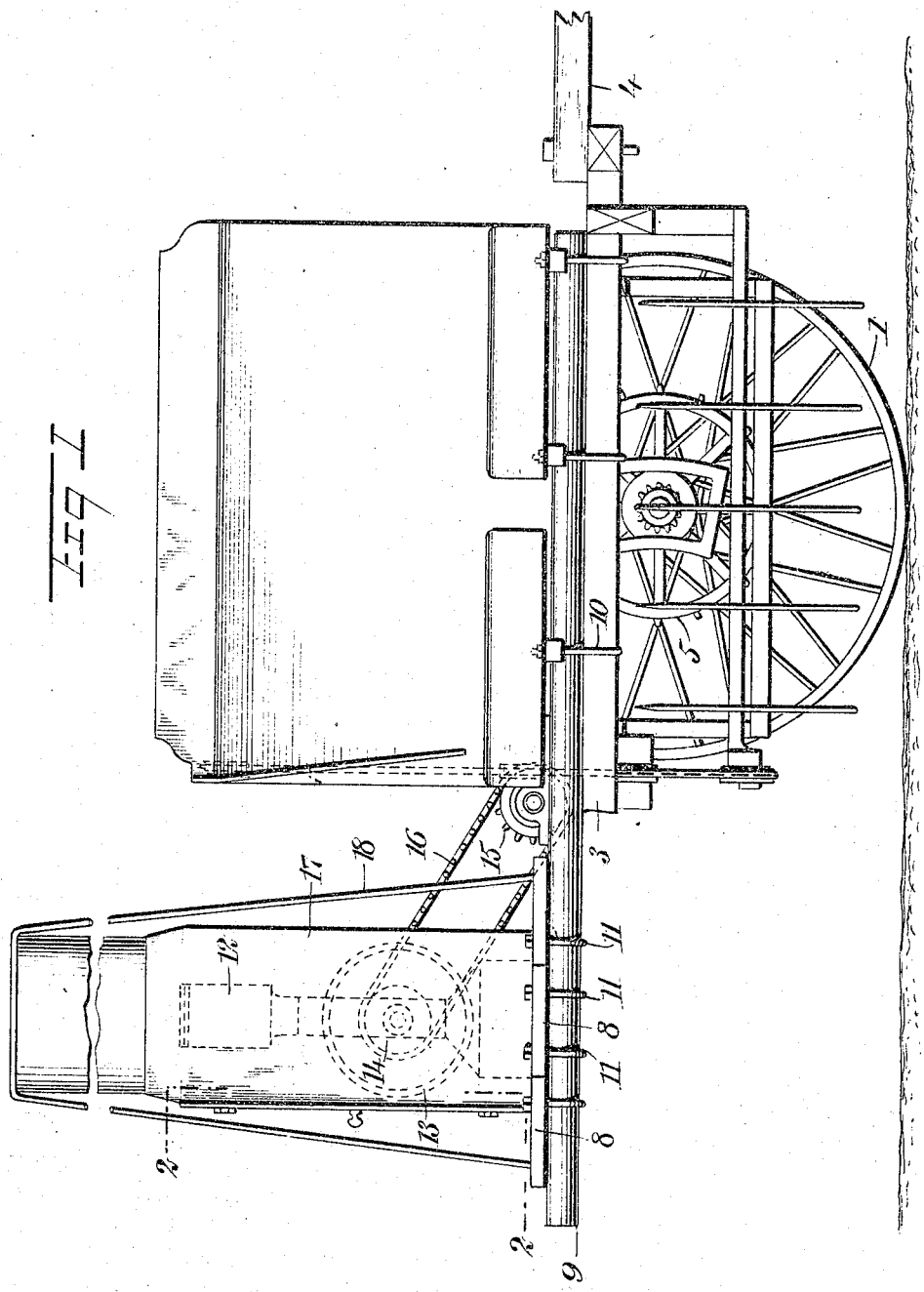

No. 867,368. PATENTED OCT. 1, 1907.
G. O. HELVIG & E. DANIELSON.
ATTACHMENT FOR TRACTION OPERATED IMPLEMENTS.
APPLICATION FILED SEPT. 17, 1906.

2 SHEETS—SHEET 1.

WITNESSES
H. Walker
C. W. Fairbank

INVENTORS
Gilbert O. Helvig
Edward Danielson
BY
Munn & Co
ATTORNEYS

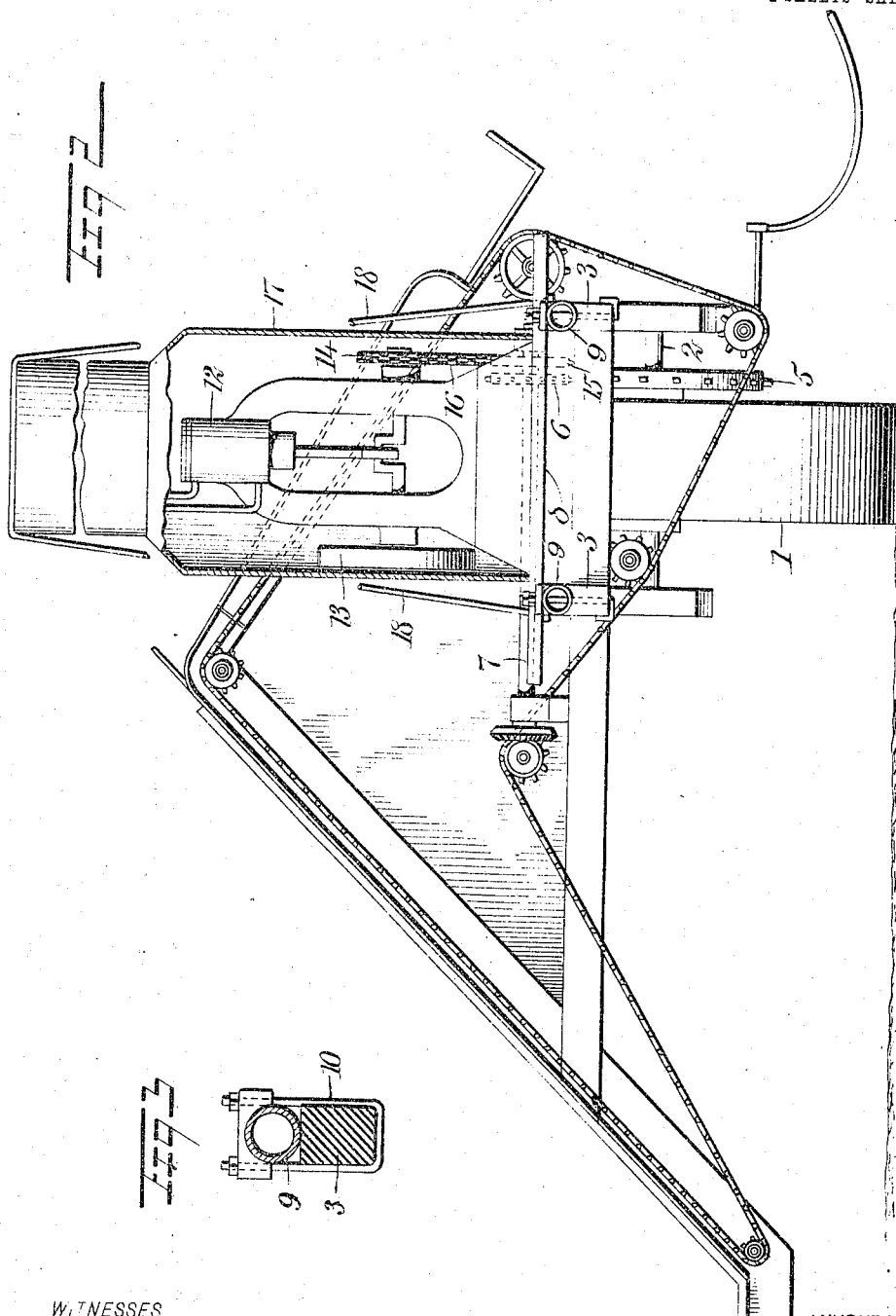

UNITED STATES PATENT OFFICE.

GILBERT O. HELVIG AND EDWARD DANIELSON, OF DAWSON, MINNESOTA.

ATTACHMENT FOR TRACTION-OPERATED IMPLEMENTS.

No. 867,368.  Specification of Letters Patent.  Patented Oct. 1, 1907.

Application filed September 17, 1906. Serial No. 334,894.

*To all whom it may concern:*

Be it known that we, GILBERT O. HELVIG and EDWARD DANIELSON, both citizens of the United States, and residents of Dawson, in the county of Lac qui Parle and State of Minnesota, have invented a new and Improved Attachment for Traction-Operated Implements, of which the following is a full, clear, and exact description.

This invention relates to certain improvements in farm implements, particularly harvesters, binders, and the like, and consists in means whereby the machinery carried on such implements may be operated independently of the traction wheels.

The object of the invention is to provide a device capable of attachment to any common form of farm implement now in use, without varying or modifying the structure of said implement in any way, such attachment comprising a suitable platform and means carried thereon for operating the mechanism of the implement.

Reference is to be had to the accompanying drawing forming a part of this specification, in which similar characters of reference indicate corresponding parts in all the figures, in which Figure 1 is a side elevation of a portion of a common form of reaper and binder having our attachment secured thereto; Fig. 2 is a rear elevation thereof, the portion on the left of the line 2—2 of Fig. 1 being removed; and Fig. 3 is a detail showing the method of attaching the platform to the frame of the binder.

Our improved attachment is capable of being secured to and used in connection with various different forms of implements, in which the frame carries machinery or moving parts adapted to be operated from the traction wheel as the implement is moved. For giving a clearer idea as to the nature of our attachment and the method in which it is secured to the frame of an implement, we have illustrated a portion of a reaper and binder provided with a main traction wheel 1, on an axle 2, which latter is mounted on the main frame of the implement. As shown, the frame comprises two longitudinal members 3 on which the machinery of the implement is supported and to which the draft-pole 4 is secured. The main axle 2 carries a large sprocket wheel 5 in the same plane with a sprocket wheel 6 mounted upon a shaft 7 carried in the upper portion of the implement. As the implement is drawn along by horses attached at the draft-pole 4, power is conducted to the shaft 7 through the sprocket wheels 6 and 5 and the chain connecting the two. Thus the amount of work required of the horses involves not only the amount required to overcome the resistance and cause the movement of the implement, but also involves the power required to operate all of the machinery carried upon the implement.

According to our invention, we provide a small gas, gasolene, alcohol or kerosene engine, of any suitable form or make, adapted to produce the required power and supported upon a platform attached to the main frame of the implement. The platform preferably comprises a plurality of boards or planks 8, extending parallel and having their ends supported upon the upper sides of two large pipes or tubes 9, which latter extend substantially the entire length of the frame of the platform and are rigidly secured thereto. As shown, the tubes or pipes 9, which constitute the main support for the platform, are bound to the longitudinal members 3 of the frame by means of U-shaped clamps 10, the form of which is clearly shown in Fig. 3. Similar clamps 11 may be employed, if desired, for holding the platform to the supporting pipes or tubes, although these clamps 11 need not be nearly as large or as strong, due to the fact that they only serve to prevent the lateral displacement of the platform rather than supporting the weight thereof.

The platform carries the engine 12, having a balance wheel 13 and a sprocket wheel 14, which latter is supported in the same plane with a sprocket wheel 15, mounted on the shaft 7, whereby the two may be connected by a chain 16, and power generated at the engine may be readily imparted to the machinery of the implement. The engine is preferably inclosed within a shell 17, braced to the platform by tie-rods 18. The top portion of the casing or shell may, if desired, constitute a radiator where water is cooled and circulated in the jacket of the engine, and the fuel supply tank, not shown, may also be supported in this upper part, to give gravity feed, or may be placed at the base of the engine and a feed pump provided.

No changes whatever are made in the structure of the implement formerly used. All that is necessary to secure our attachment in place involves the bolting of the tubes 9 to the frame of the implement and the removal of the sprocket chain from the sprocket wheels 5 and 6, and the adjusting of said sprocket chain on the sprockets 14 and 15. The engine employed may be a comparatively small one, and its weight would not materially increase the weight of the implement, but as the engine operates all of the machinery of the implement, the power required of the horses to draw the same is reduced to a very material extent, thus making it possible to operate the machine at a much faster rate and with far greater efficiency.

It is evident that any form of engine desired may be employed, it only being essential that such engine have a shaft from which power may be readily conveyed to the auxiliary shaft 7 of the implement. If anything should accidentally happen to the engine or the supply of fuel run out, or for any other reason it is not seen fit to operate the same, it is evident that the chain may be readily operated in the same manner as heretofore.

Inasmuch as no permanent changes of any kind whatsoever are required to be made in the structure of the implement and as the platform may be secured to the frame in any suitable manner and to any vehicle required, it will be understood that our invention is in no way limited to the specific implement shown, nor to the specific means for securing the platform thereto.

It is evident that if desired the engine may be turned one-quarter way round and connected to the implement in a slightly different manner from that shown.

Having thus described our invention, we claim as new and desire to secure by Letters Patent:

1. In combination, an implement having a main frame, machinery carried thereby, a main shaft, a traction wheel mounted thereon, a sprocket wheel on said shaft, whereby the machinery may be operated from said shaft, a plurality of pipes or tubes adjacent and parallel to the opposite sides of said main frame and extending outwardly therefrom, the outer ends being unsupported means for rigidly securing said pipes or tubes to said frame, a platform rigidly but detachably secured to said pipes or tubes at the outer ends thereof, an engine supported upon said platform, means whereby the machinery may be operated by said engine, and a casing surrounding said engine and secured to said platform.

2. In combination, an implement, comprising a main frame having parallel side members, a traction wheel, machinery supported upon said main frame and adapted to be operated by said traction wheel, longitudinal supports rigidly secured to the side members of the frame and extending outwardly therefrom, a platform carried by said supports, an engine carried by said platform, and means for operatively connecting said engine to the machinery of the implement.

In testimony whereof we have signed our names to this specification in the presence of two subscribing witnesses.

GILBERT O. HELVIG.
EDWARD DANIELSON.

Witnesses:
A. J. PETERSON,
EDW. SWANSON.